United States Patent
Zhong et al.

[11] Patent Number: 6,106,927
[45] Date of Patent: Aug. 22, 2000

[54] ULTRA-SMOOTH AS-DEPOSITED ELECTROLESS NICKEL COATINGS

[75] Inventors: Linda L. Zhong, Anaheim; Connie C. Liu, Fremont, both of Calif.

[73] Assignee: Seagate Technology, Inc., Scotts Valley, Calif.

[21] Appl. No.: 09/122,761

[22] Filed: Jul. 27, 1998

Related U.S. Application Data

[60] Provisional application No. 60/073,530, Feb. 3, 1998.

[51] Int. Cl.$^7$ ........................................ G11B 5/66
[52] U.S. Cl. ............... 428/141; 428/694 T; 428/694 TS; 428/694 SG; 428/800; 427/304; 427/305; 427/306; 427/128; 427/129; 427/130
[58] Field of Search ...................... 427/304–306, 427/128–130; 428/694 T, 694 TS, 694 SG, 141, 900

[56] References Cited

U.S. PATENT DOCUMENTS 5,141,778 8/1992 Yorkosky .................. 427/304

OTHER PUBLICATIONS

"The Electroless Nickel Process for Memory Disks", J.B. Hajdu, E.F. Yarkosky, P.A. Cacciatore, M.H. Suplicki. Electrochemically Society Magnectic Materials, Processes, and Devices. Electro Deposition Division Proceedings vol. 92–10, pp. 39–55.

*Primary Examiner*—Leszek Kiliman
*Attorney, Agent, or Firm*—McDermott, Will & Emery

[57] ABSTRACT

Ultra smooth as-deposited electroless nickel coatings are achieved employing a plating bath containing aluminum and/or copper ions. Embodiments include electroless deposition of an amorphous nickel-phosphorous coating on a glass, glass-ceramic, ceramic, or aluminum-containing substrate, with an as deposited average surface roughness (Ra) of less than about 16 Å, depositing an underlayer, and depositing a magnetic layer to form a magnetic recording medium.

20 Claims, 2 Drawing Sheets

1800X

1800X

ULTRA-SMOOTH AS-DEPOSITED ELECTROLESS NICKEL COATINGS

RELATED APPLICATION

This application claims priority from Provisional Application Ser. No. 60/073,530 filed Feb. 3, 1998, entitled "NEW PLATING PROCESS OF ULTRA-SMOOTH SUBSTRATE SURFACE FOR MAGNETIC STORAGE DISKS", the entire disclosure of which is hereby incorporated herein by reference.

TECHNICAL FIELD

The present invention relates to nickel (Ni) plated substrates and to a method of electrolessly depositing NiP on a substrate. The present invention has particular applicability to high areal density magnetic recording media exhibiting low noise and high coercivity, and tribology allowing sub-$1\mu"$ head-disk spacing.

BACKGROUND ART

Ni plating, particularly electroless Ni platings or deposits, enjoys technological applicability in various industries, such as the electronic, oil and gas, aerospace, machinery, automobile and magnetic recording media industries. Electroless Ni is employed in the metal finishing industry for various metal substrates, including steel, copper, Ni, aluminum and alloys thereof. Conventional electrolessly deposited Ni-phosphorous (P) platings exhibit desirable physical and chemical properties, such as hardness, lubricity, appearance, and corrosion resistance. An amorphous NiP plating is conventionally applied to a non-magnetic substrate, such as aluminum (Al) or an Al-alloy substrate in manufacturing magnetic recording media.

In operation, a magnetic disk is normally driven by the contact start-stop (CSS) method, wherein the head begins to slide against the surface of the disk as the disk begins to rotate and, upon reaching a predetermined high rotational speed, the head floats in air at a predetermined distance from the surface of the disk due to dynamic pressure effects caused by the air flow generated between the sliding surface of the head and the disk. During reading and recording operations, the transducing head is maintained at a controlled distance from the recording surface, supported on a bearing of air as the disk rotates. Upon terminating operation of the disk drive, the rotational speed of the disk decreases and the head begins to slide against the surface of the disk again and eventually stops in contact with and pressing against the disk. Thus, each time the head and disk assembly is driven, the sliding surface of the head repeats the cyclic operation consisting of stopping, sliding against the surface of the disk, floating in air, sliding against the surface of the disk and stopping.

In order to achieve high areal density, it is considered necessary to minimize the flying height of the head above its associated recording surface. Thus, conventional textured substrates must be provided with an extremely smooth and defect free surface in order to achieve the requisite low flying height for high areal recording density. The absence of pits is especially important, since pits adversely affect magnetic recording.

It is recognized, however, that electroless metal plating, such as electroless Ni plating of a substrate, does not achieve a coating exhibiting a desired degree of surface smoothness, particularly the degree of smoothness necessary to satisfy the high areal recording density objectives of current magnetic recording media.

The continuing drive for higher areal recording density with an attendant reduction in the requisite flying height imposes greater requirements for surface smoothness. Market competitiveness further requires achievement of ultra-smooth electroless Ni coatings on non-magnetic substrates with increased manufacturing throughput and higher yield. Efforts to that end are constantly being evaluated. See, for example, Hajdu, J. B. et al., "THE ELECTROLESS NICKEL PROCESS FOR MEMORY DISKS", "The Electrochemically Society Magnetic Materials, Processes, and Devices", Electro Deposition Division Proceedings, Vol. 92-10, pages 39–55, 1992. In U.S. Pat. No. 5,141,778, it is disclosed that the introduction of cadmium ions in an electroless Ni plating bath enhances the surface smoothness of the deposited Ni coating. A strike bath was recommended in the plating process due to a shortened bath life due to the cadmium ions. Furthermore, the smoothing agents do not reduce the plating defects, such that no improvement of media yield was realized. Conventional methodology, however, has not been particularly successful in obtaining an electroless Ni coating exhibiting an average surface roughness (Ra) less than about 40 Å, particularly less than about 30 Å if the as manufactured or as received blanks are rougher than 150 Å, when the roughness is measured by a TMS (Texture Measurement System) or a Tencor.

Accordingly, there exists a need for as-deposited ultra-smooth electrolessly deposited Ni coatings having reduced plating defects. There exists a particular need for methodology enabling the electroless deposition of amorphous NiP coatings on non-magnetic substrates, which coatings have an as-deposited Ra less than about 30 Å.

DISCLOSURE OF THE INVENTION

An advantage of the present invention is an article comprising a substrate with an electrolessly deposited Ni coating thereon having an as-deposited ultra-smooth surface.

Another advantage of the present invention is a magnetic recording medium for high areal recording density exhibiting low noise, high coercivity and comprising an electroless amorphous NiP coating deposited on a non-magnetic substrate and having an ultra-smooth as-deposited surface.

Another advantage of the present invention is a method of electrolessly depositing a Ni coating with an ultra-smooth as-deposited surface.

According to the present invention, the foregoing and other advantages are achieved by an article comprising a substrate; and a Ni coating having an Ra less than about 30 Å.

Another aspect of the present invention is a magnetic recording medium comprising a non-magnetic substrate, an amorphous NiP coating having an as-deposited Ra less than about 30 Å, which NiP coating was deposited from a plating bath containing an effective amount of Al and/or copper (Cu) ions to achieve the as-deposited Ra of less than about 30 Å.

Another aspect of the present invention is a method of electrolessly depositing a smooth Ni coating on a substrate, the method comprising depositing the electroless Ni coating employing metal plating bath containing Al and/or Cu ions in an effective amount to achieve an as-deposited surface Ra of less than about 30 Å.

Another aspect of the present invention is a method of manufacturing a magnetic recording medium, the method comprising: electrolessly plating an amorphous NiP coating on a non-magnetic substrate employing a plating bath containing Al and/or Cu ions in an effective amount to achieve an as-deposited Ra of less than about 30 Å.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its details are capable of modifications in various obvious respects, all without departing from the present invention. Accordingly, the drawing and description are to be regarded as illustrative in nature, and not as restrictive.

DESCRIPTION THE INVENTION

Figure 1:
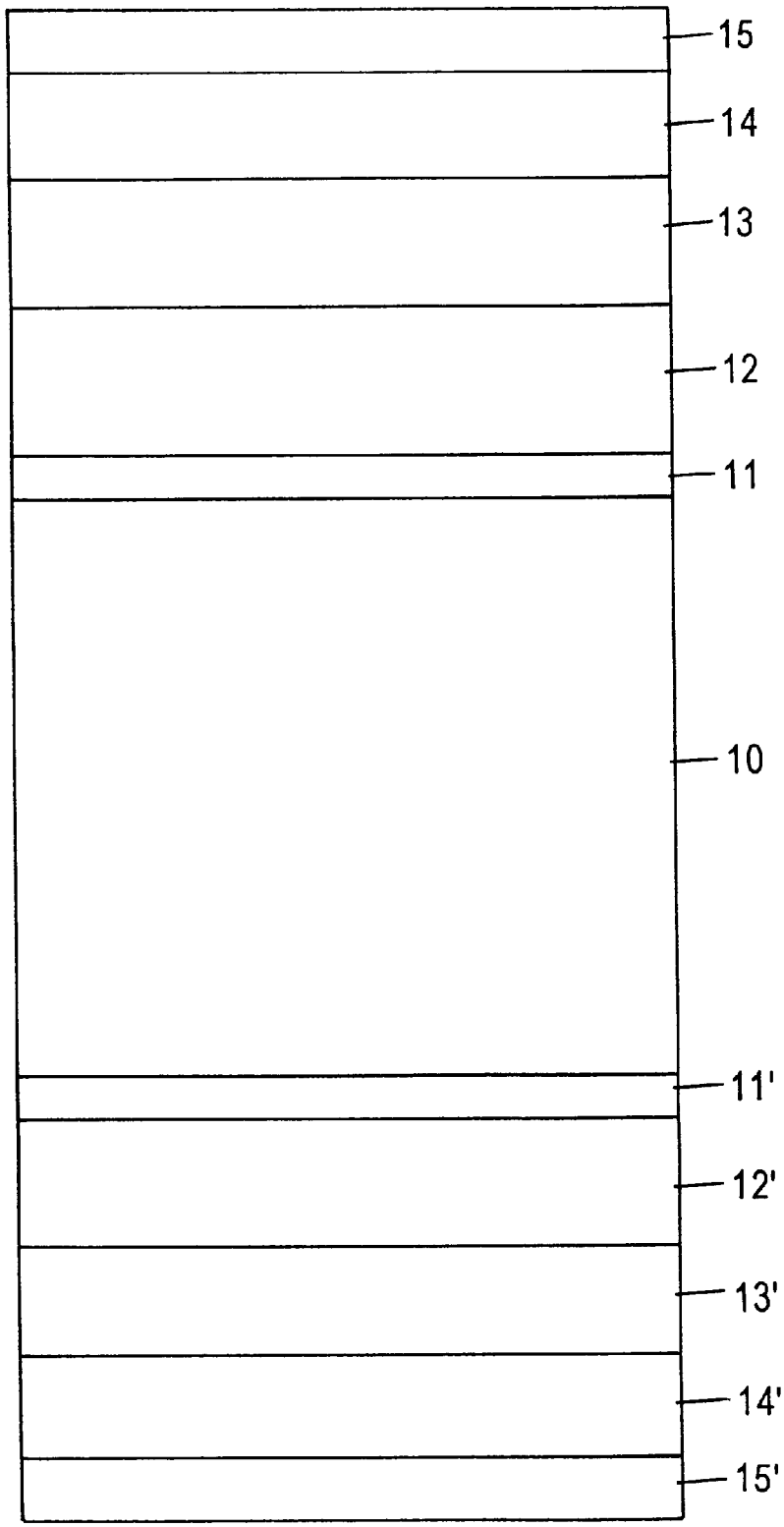
FIG. 1 schematically illustrates a magnetic recording medium to which the present invention is applicable.

The present invention advantageously achieves electroless deposition of Ni coatings having an Ra less than about 30 Å, such as less than about 25 Å. In fact, during production trials, electroless amorphous NiP coatings were deposited having an as-deposited Ra of less than about 16 Å. The achievement of such ultra-smooth as-deposited electroless Ni coatings yields several technological advantages. For example, subsequent polishing, as typically employed in manufacturing a magnetic recording medium involving a rough polishing stage and a fine polishing stage, as by chemical mechanical polishing (CMP), can be significantly reduced by omitting the rough CMP stage. In addition, the present invention reduces polishing cycles and cycle time, while enhancing yield by at least 10%. The electroless deposition of NiP coatings having an as-deposited ultrasmooth surface enables and facilitates the manufacture of magnetic recording medium having high areal recording density, by enabling a reducing in the flying height of the head.

The present invention stems from the discovery that the incorporation of certain metal ions in a plating bath for electroless Ni deposition significantly enhances the smoothness of the as-deposited surface. These metal ions include Al and/or Cu ions. The metal ions can be incorporated in the electroless Ni plating bath in any of various forms, such as a salt. For example, it has been found suitable to introduce Al ions in the plating bath in the form of aluminum sulfate, e.g., $Al_2(SO_4)_3 \cdot 16H_2O$, and Cu ions in the form of copper sulfate ($CuSO_4$). Given the objectives and guidance of the present disclosure, the optimum amount of metal ions incorporated in the plating bath can easily be determined in a particular situation. For example, it has been found suitable to include Al ions in the plating bath at a concentration of up to about 20 parts per million (ppm), such as about 0.1 to about 10 ppm, e.g., about 3 to about 5 ppm. It was also found suitable to include Cu ions in the plating bath at a concentration of about 5 to about 10 ppm, e.g., about 7 to about 9 ppm. For example, $CuSO_4$ can be introduced into a plating bath at a concentration of about 17.6 ppm to achieve a Cu ion concentration of about 7 ppm.

Quite unexpectedly, it was found that the dramatic enhancement in as-deposited surface smoothness can be achieved by introducing Al and/or Cu ions into the plating bath at any time before or during plating. For example, Al and/or Cu ions can be introduced into the electroless Ni plating bath at any particular time before the end of plating, continuously during plating, or at multiple feeding times during plating. The Al and/or Cu ions can also be added to the Ni replenishment solution in a conventional electroless deposition system prior to plating. It was also unexpected that the advantages of the present invention stemming from the introduction of Al and/or Cu ions into the plating bath can be achieved independent of the original Ni-P nodule size.

The exact mechanism involved in the dramatic improvement in as-deposited surface smoothness achieved by the present invention is not known with certainty. During the initial nucleation phase of electroless deposition, the nucleation rate is primarily a function of surface tension which, in turn, depends upon other variables, such as pH, temperature, the chemical properties of the plating bath, and impurities therein. The growth rate is primarily a function of the concentration of plating ingredients, e.g., Ni and P, and the temperature. The Ni-P nodule size is dependent upon a balance of the nucleation rate and growth rate. It is believed that the advantages achieved by the present invention, which are independent of the original Ni—P nodule size, stem from activation of additional nodule sites by Al and/or Cu ions in lower areas between the nodules, or on the grinds, scratches, or inside plating pits with larger surface areas.

Figure 2A:
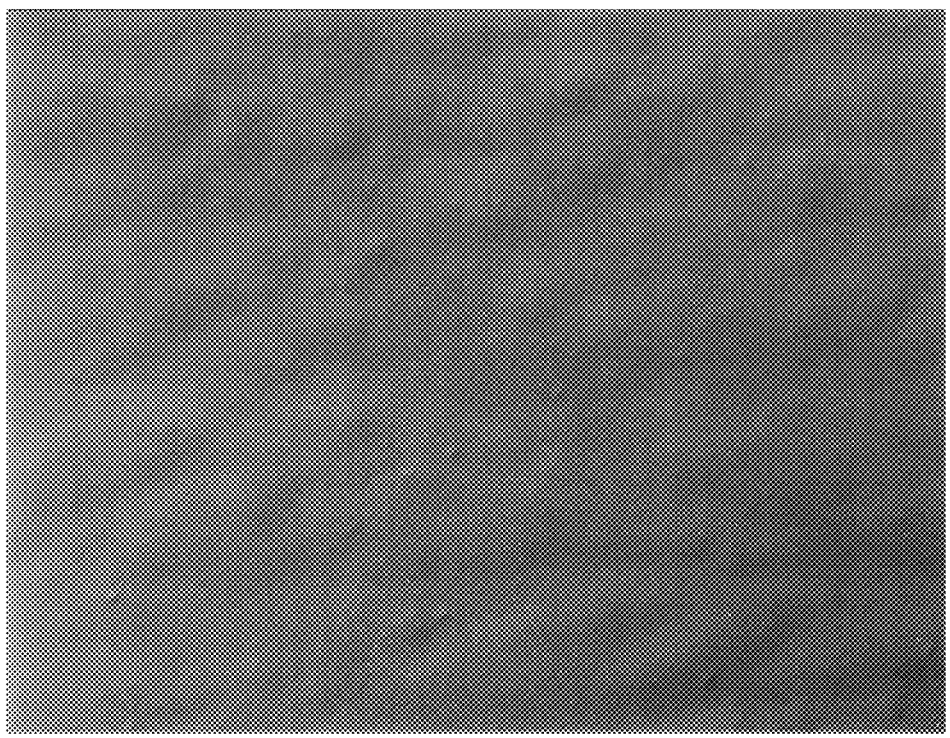
FIG. 2A is a photomicrograph of an ultrasmooth Ni coating in accordance with the present invention.
Figure 2B:
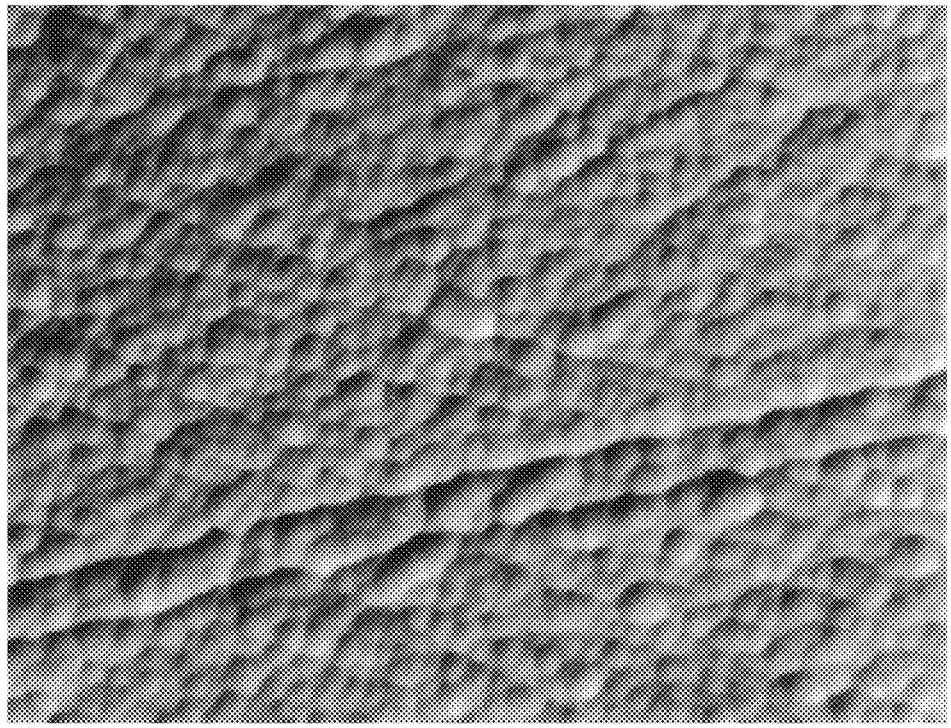
FIG. 2B is a photomicrograph of a conventional Ni coating.

The dramatic difference in surface smoothness achieved by the Ni coatings electrolessly plated in accordance with the embodiments of the present invention vis-a-vis conventional electroless Ni coatings can be appreciated by comparing FIG. 2A to FIG. 2B. FIGS. 2A and 2B are photomicrographs of as-deposited nickel at a magnification of 1800×. The ultrasmooth surface (FIG. 2A) characterizes the Ni deposited in accordance with the present invention vis-a-vis a rather coarse surface on the electroless Ni deposited in accordance with conventional practices (FIG. 2B).

The electroless Ni plating baths employed in the present invention can be any conventional electroless Ni plating composition, such as those disclosed in U.S. Pat. No. 5,141,778, U.S. Pat. No. 4,567,066 and those disclosed in the previously mentioned Hajdu et al. publication entitled "The Electroless Nickel Process For Memory Disks", the entire disclosures of which are hereby incorporated herein by reference. In addition, the substrate can be initially zincated as disclosed in U.S. Pat. No. 5,141,778 and U.S. Pat. No. 4,567,066.

Electroless Ni plating compositions generally comprise four ingredients dissolved in a solvent, typically water. These ingredients include: (1) a source of Ni ions; (2) a reducing agent, such as a hypophosphite or an amine borane; (3) an acid or hydroxide pH adjuster to provide a suitable pH; and (4) a complexing agent for metal ions sufficient to prevent their precipitation in solution. Such suitable complexing agents are well known in the art. Accordingly, upon employing a hypophosphite as the reducing agent, the deposit will contain Ni and P. On the other hand, if an amine borane is employed, the deposit will contain Ni and boron.

Ni ions can be provided by employing a suitable soluble salt, such as NiP, nickel chloride, nickel acetate and mixtures thereof. The concentration of Ni in solution can vary widely. Ni concentrations include about 0.1 to about 100 g/l, such as about 2 to about 50 g/l, e.g., about 2 to about 10 g/l.

The reducing agent employed, particularly in manufacturing a magnetic recording medium, is typically hypophosphite ion supplied to the bath by any suitable source, such as sodium, potassium, ammonium and nickel hypophosphite.

Other reducing agents, such as amine boranes, borohydrides and hydrazine, can also suitably be employed. The concentration of the reducing agent is generally in excess of the amount sufficient to reduce the Ni in the bath.

The plating bath can be acid, neutral or alkaline, and the acid or alkaline pH adjustor can be selected from a wide range of materials, such as ammonium hydroxide, sodium hydroxide, and hydrochloric acid. The pH of the bath may range from about 2 to about 12, such as about 4 to about 5, e.g., about 4.43 to about 4.83. The complexing agent can be selected from a wide variety of materials, such as lactic acid, malic acid, and those containing anions such as acetate, citrate, glycolate, pyrophosphate, and mixtures thereof. Ranges for the complexing agent, based on the anion, can vary widely, such as about 1 to about 300 g/l, e.g., about 5 to about 50 g/l.

The electroless Ni plating baths employed in the present invention can also contain other conventional additives, such as buffering agents, bath stabilizers, rate promoters, brighteners, etc. Stabilizers such as lead, antimony, mercury, tin and oxy compounds, such as iodate, can also be employed. A suitable bath can be formed by dissolving the ingredients in water and adjusting the pH to the desired range.

In accordance with embodiments of the present invention, the NiP coatings can be applied to a thickness of about 80 microinches ($\mu$") to about 600 $\mu$". Embodiments of the present invention include an immersion time of about 10 minutes to about 2.5 hours to achieve a thickness of about 80 $\mu$" to about 600 $\mu$". A temperature range of about 25° C. to boiling, e.g., about 100° C., can be employed, e.g., about 30° C. to about 95° C.

The present invention stems from the discovery that the introduction of Al and/or Cu ions into an electroless Ni plating bath or before electroless deposition, e.g., at a predetermined time during or at a plurality of predetermined times during deposition, enables electroless deposition of Ni coatings having an as-deposited Ra less than about 30 Å, such as less than about 25 Å, e.g., less than about 16 Å, independent of the original nodule size. Ultra smooth electroless nickel platings according to the present invention can be deposited on any of various substrates, including those on which Ni has previously been electrolessly deposited. The present invention advantageously increases production throughput and reduces costs by reducing the polish cycle time as well as number of polishing steps, and by reducing the plating defects and increasing yield. The electroless Ni coatings deposited in accordance with the present invention exhibit increased uniformity thereby providing greater protection for the underlying substrate, reduced chemical corrosion and improved wear resistance. The present invention enjoys applicability in various industries wherein Ni coatings are electrolessly deposited on various types of substrates, including the machinery and automotive industries. The present invention enjoys particular applicability in manufacturing high areal density magnetic recording media.

For example, the present invention is applicable to the manufacture of a magnetic recording medium depicted in FIG. 1 comprising a substrate 10, typically an Al-alloy, such as an Al-magnesium (AlMg) alloy plated in accordance with the present invention with a layer of amorphous NiP. Alternative substrates include metal matrix composites, reacted metal-ceramics, glass, ceramic and glass-ceramic materials, graphite and metal matrix composites, such as $B_4C$—Al. There are typically sequentially sputter deposited on each side of substrate 10 an adhesion enhancement layer 11, 11', e.g., chromium (Cr) or a Cr alloy, a seedlayer 12, 12", such as NiP, an underlayer 13, 13', such as Cr or a Cr alloy, a magnetic layer 14, 14", such as a cobalt (Co)-based alloy, and a protective overcoat 15, 15', such as a carbon-containing overcoat. Typically, although not shown for illustrative convenience, a lubricant topcoat is applied on the protective overcoat 15, 15'. It should be understood that the present invention is applicable to the production of various types of magnetic recording media, and is not limited to any particular substrate material, underlayer, magnetic layer, protective overcoat or lubricant topcoat.

Only certain embodiments of the present invention and but a few examples of its versatility are shown and described in the present disclosure. It is to be understood that the present invention is capable of use in various other combinations and environments and is capable of changes and modifications within the scope of the inventive concept as expressed herein.

What is claimed is:

1. An article comprising:
   a substrate; and
   a nickel coating electrolessly deposited using a bath containing aluminum and/or copper ions in an amount effective to achieve an as-deposited average surface roughness (Ra) less than about 30 Å.

2. The article according to claim 1, wherein the nickel coating has an as-deposited Ra less than about 25 Å.

3. The article according to claim 2, wherein the nickel coating has an as-deposited Ra less than about 16 Å.

4. The article according to claim 1, wherein the nickel coating comprises amorphous nickel-phosphorous and contains aluminum and/or copper atoms.

5. The article according to claim 4, wherein the nickel coating contains copper atoms.

6. The article according to claim 4, wherein the nickel coating is electrolessly deposited using a bath containing copper ions at a concentration of about 2 to about 20 parts per million.

7. The article according to claim 4, wherein the nickel coating was electrolessly deposited using a bath containing aluminum ions at a concentration of about 0.1 to about 10 parts per million.

8. The article according to claim 1, wherein the substrate is a non-magnetic substrate, the article further comprising:
   an underlayer; and
   a magnetic layer, the article constituting a magnetic recording medium.

9. The article according to claim 8, wherein the non-magnetic substrate comprises a glass, a ceramic, a glass-ceramic material, metal matrix composites, reacted metal-ceramics, aluminum or an aluminum alloy.

10. The article according to claim 1, further comprising at least one zincate coating on the substrate, and the nickel coating on the zincate coating.

11. A method of electrolessly depositing a smooth nickel coating on a substrate, the method comprising electrolessly depositing the nickel coating employing a metal plating bath containing aluminum and/or copper ions in an effective amount to achieve an as-deposited average surface roughness (Ra) less than about 30 Å.

12. The method according to claim 11, comprising electrolessly depositing the nickel coating employing a metal plating bath containing aluminum and/or copper ions in an effective amount to achieve an as-deposited Ra less than about 25 Å.

13. The method according to claim 12, comprising electrolessly depositing the nickel coating employing a metal plating bath containing aluminum and/or copper ions in an effective amount to achieve an as-deposited Ra less than about 16 Å.

14. The method according to claim 11, wherein the bath contains aluminum ions at a concentration of about 0.1 to about 20 parts per million.

15. The method according to claim 14, wherein the bath contains aluminum ions at a concentration of about 3 to about 5 parts per million.

16. The method according to claim 11, wherein the bath contains copper ions at a concentration of about 2 to about 10 parts per million.

17. The method according to claim 16, wherein the bath contains copper ions at a concentration of about 5 to about 7 parts per million.

18. The method according to claim 11, wherein the substrate comprises a glass, a glass-ceramic, a ceramic, aluminum or an aluminum alloy, the method comprising:
   depositing an amorphous nickel-phosphorous coating on the substrate;
   depositing an underlayer; and
   depositing a magnetic layer to form a magnetic recording medium.

19. The method according to claim 11, further comprising depositing at least one zincate coating on the substrate, and electrolessly depositing the nickel coating on the at least one zincate coating.

20. The article produced by the method according to claim 11.

* * * * *